United States Patent [19]

Loughrie

[11] 4,113,184
[45] Sep. 12, 1978

[54] WET GRINDING METHOD FOR CRUDE PHOSPHATE ROCK

[75] Inventor: Gregory D. Loughrie, Tampa, Fla.

[73] Assignee: CF Industries, Inc., Long Grove, Ill.

[21] Appl. No.: 834,281

[22] Filed: Sep. 19, 1977

[51] Int. Cl.$^2$ ............................................. B02C 23/18
[52] U.S. Cl. ..................................... 241/15; 241/21; 423/167
[58] Field of Search ....................... 241/15, 16, 21, 22, 241/30; 423/167

[56] References Cited

U.S. PATENT DOCUMENTS

| | | | |
|---|---|---|---|
| 2,571,866 | 10/1951 | Greene | 423/167 |
| 2,843,456 | 7/1958 | Porter | 423/167 |
| 3,113,838 | 12/1963 | Perri et al. | 423/167 |
| 3,204,877 | 9/1965 | Barr et al. | 241/15 |
| 4,042,666 | 8/1977 | Rice et al. | 423/167 |
| 4,044,107 | 8/1977 | Houghtaling | 241/21 |

*Primary Examiner*—Granville Y. Custer, Jr.
*Attorney, Agent, or Firm*—Olson, Trexler, Wolters, Bushnell & Fosse, Ltd.

[57] ABSTRACT

This application discloses a method of wet grinding crude phosphate rock containing clay minerals and the like impurities. The procedures of the invention produce a rock slurry of enhanced fluidity and a desired degree of economy; and the principles of the invention may be applied to rock slurries after size-reduction. The method of the invention contemplates introducing coarsely sized, crude phosphate rock with component clay minerals or the like into a grinding mill together with a suitable quantity of water and with an amount of a calcium-free alkaline amendment or additive material which is adequate to establish and maintain a pH of at least about 8.5 in the mixture.

10 Claims, No Drawings

WET GRINDING METHOD FOR CRUDE PHOSPHATE ROCK

BACKGROUND OF THE INVENTION

This invention relates generally to the manufacture of phosphoric acid or triple superphosphate from phosphate rock and relates more particularly to the wet grinding of crude phosphate rock for use in such manufacture.

In many deposits of rock phosphate, the basic material occurs in natural combination with various quantities of clay minerals which include impure hydrated aluminum silicates. These latter have been found to produce adverse effects in wet grinding procedures and in subsequent transport of the pulverized rock in the form of a water slurry.

It has been proposed heretofore to incorporate surfactants into the ground rock slurry either before or after it leaves the grinding mill in order to facilitate pumping. However, effective levels of such surfactants contribute unacceptable cost disadvantages and may possibly interfere with gypsum crystal formation during subsequent acidulation of the slurry.

Therefore, an important object of the present invention is to provide an economical method of improving the processability of a phosphate rock slurry having a high clay content.

A more general object of the invention is to provide a new and highly advantageous method of fluidizing rock slurries.

Another object of the invention is to provide a procedure for wet grinding phosphate rock wherein the resultant slurry has enhanced fluidity.

Still another object of this invention is to provide a method of wet grinding crude phosphate rock which permits subsequent handling of rock slurries of higher than normal rock solids content.

These and other objects and features of the invention will become more apparent from a reading of the following descriptions, relating specifically to the wet grinding of phosphate rock but to which the application is not to be restricted.

DETAILED DESCRIPTION OF THE PREFERRED EMBODIMENT

In the wet process manufacture of phosphoric acid for triple superphosphate production or other such uses, it is common practice to feed coarsely crushed or pebble rock to a rotary grinding mill that is charged with a suitable ball-, pebble-, or rod-type medium, water being introduced in order to promote size reduction and minimize dusting. Grinding of the phosphate rock is performed in order to increase the surface area of the phosphate mineral making it more available to chemical attack by its subsequent contact with sulfuric acid. The extent of size reduction is preferably sufficient such that a majority of the pulverized rock passes a 30-mesh Tyler screen.

Water is added to the rock being ground in amounts adequate to produce a slurry for ease in subsequent transport, preferably at least about 20% by weight of the resultant slurry and as much as about 35% by weight of the slurry. In calculating the water content of the slurry, the initial water content of the crude rock is included. This initial water content is ordinarily in the range of about 4–15% by weight of the unground rock.

After size reduction and slurry formation, the pulverized phosphate rock/water mixture is passed from the grinding mill to an attack tank where it is subjected to the action of sulfuric acid in accordance with known procedures and reactions. Advantageously, the ground phosphate rock slurry is screen-classified to a suitable maximum particle size before it is transported to the attack tank.

Phosphate rock from certain sources contains adverse quantities of clay minerals and other silicate-containing materials; and in accordance with the features of the present invention, the adverse effect of these materials is counteracted by introducing a substantially calcium-free alkaline amendment or additive material into the mixture of crude rock and water at the grinding mill and in such quantities as to establish and maintain a pH of at least about 8.5 in the mixture and preferably in the range of between about 9.5 and about 10.0 pH. The specific amount of the alkaline additive material to be introduced is selected in accordance with the solids content of the slurry, the alkalinity of the additive material and the amount of siliceous impurity in the crude rock which is to be compensated for. Various alkaline materials may be employed as the additive in this regard, including such common chemicals of commerce as caustic soda, caustic potash, sodium carbonate, and ammonium hydroxide, as well as mixtures of such materials with other agents such as surfactants. In one phosphate rock with a troublesome clay content, an addition of about 3.75 pounds of caustic soda per ton of crude rock proved eminently successful in producing an easily pumpable rock/water slurry containing approximately 67–69% solids. Use of calcium based alkalis is inappropriate and defeats the objective of increasing fluidity of the slurry.

The fluidity of the treated slurry has been taken as a measure of silicate impurity compensation; and in this regard, treating the slurry to maintain it at a viscosity of less than about 1800 centipoises is preferred. This latter degree of flowability may also be expressed as a fluidity level of about 600 grams per minute and is associated with the pH levels described immediately herein above. By way of comparison, incorporation of the alkaline additive material of the present invention, specifically caustic soda, at a level of 2.1 pounds per ton of a given crude phosphate rock has produced a fluidity value of 814 grams per minute whereas the use of a surfactant only, specifically sulfonated lignin, at a level of 4.2 pounds per ton of the same rock produced a fluidity value of only 468 grams per minute, less than the desired level.

In order to describe the present invention more fully, the following specific examples are given without, however, intending to limit the invention to all of the precise details and conditions set forth.

EXAMPLE I

Previously mined Florida pebble phosphate rock about ½-inch diameter in size and having about 8–12% be weight of contained water was introduced into a wet ball mill at a rate of about 192 tons per hour. Fresh water was supplied to the ball mill at a rate of about 165–170 gallons per minute. In addition, a 50% water solution of caustic soda was added at the rate of 3.75 pounds of caustic per ton of rock. The outflow from the ball mill was a slurry containing approximately 67–69% solids.

The outflow from the ball mill was screened to pass a 30-mesh Tyler screen with oversize material being returned to the mill as recycle product. Screenability was visually determined to be completely satisfactory; and the fluidity of the slurry passing the screen was determined to be greater than 600 grams per minute by collecting the flow for a timed 1 minute period in a suitable container and weighing the material on a platform scale. Good pumping operation was experienced in transporting the slurry to the attack tank.

EXAMPLES II-V

In addition, pre-ground phosphate rock was mixed with water and various alkaline additive materials. These mixtures were compared with the untreated phosphate rock/water slurry on the bases of pH and fluidity, with the following results:

| additive | additive addition rate (parts per 1000 parts of slurry by weight) | flow rate (gm./min.) | pH |
| --- | --- | --- | --- |
| — | — | 39.0 | 7.0 |
| $NH_4OH$ | app. 4 | 1066.4 | 9.3 |
| KOH | 2 | 1491.2 | 10.0 |
| NaOH | 2 | 1658.4 | 11.0 |
| $NaCO_3$ | 10 | 804.8 | 10.2 |

Attempts to increase the pH of the slurry using lime resulted in a "setting up" or near solidification of the mixture.

The specific examples herein described are to be considered as being primarily illustrative. Various changes will, no doubt, occur to those skilled in the art; and such changes are to be understood as forming a part of this invention insofar as they fall within the spirit and scope of the appended claims.

I claim:

1. The method of wet grinding crude phosphate rock containing clay minerals or like siliceous impurities, which comprises the steps of: introducing coarsely sized, crude phosphate rock containing clay minerals or the like into a grinding mill with at least about 20% by weight of water; introducing a substantially calcium-free alkaline additive material into the mixture of crude rock and water to establish and maintain a pH of at least about 8.5 in the mixture; and wet grinding said mixture to a selected particle size whereby to produce a conveniently processable slurry.

2. The method according to claim 1 which further comprises the step of pumping said slurry.

3. The method according to claim 1 wherein the pH of said mixture is established between about 9.5 and about 10.0.

4. The method according to claim 1 wherein said slurry is maintained at a viscosity of less than about 1800 centipoises.

5. The method according to claim 1 wherein said alkaline additive material is caustic soda.

6. The method according to claim 1 wherein said alkaline additive material is caustic potash.

7. The method according to claim 1 wherein said alkaline additive material is ammonium hydroxide.

8. The method according to claim 1 wherein said alkaline additive material is sodium carbonate.

9. The method of treating a mineral rock slurry to enhance to fluidity thereof which comprises the step of introducing a substantially calcium-free alkaline additive material into a slurry of mineral rock and water to establish and maintain a pH of at least about 8.5 in the mixture.

10. The method according to claim 9 wherein the pH of the mixture is established between about 9.5 and about 10.0.

* * * * *